Jan. 16, 1951  C. W. CHILLSON  2,538,352
MECHANICAL PITCH CHANGE MECHANISM

Filed Nov. 2, 1945  4 Sheets-Sheet 2

Inventor
Charles W. Chillson
BY
Attorney

Jan. 16, 1951      C. W. CHILLSON      2,538,352
MECHANICAL PITCH CHANGE MECHANISM

Filed Nov. 2, 1945      4 Sheets—Sheet 4

Inventor
Charles W. Chillson
BY
Attorney

Patented Jan. 16, 1951

2,538,352

UNITED STATES PATENT OFFICE 2,538,352

MECHANICAL PITCH CHANGE MECHANISM

Charles W. Chillson, Caldwell, N. J., assignor to Curtiss-Wright Corporation, a corporation of Delaware Application November 2, 1945, Serial No. 626,336

11 Claims. (Cl. 170—160.35)

This invention relates to propeller pitch changing mechanism and more particularly to a planetary mechanism for effecting changes in pitch deriving power therefor from a relatively stationary source such as the propeller prime mover, or other suitable stationary motor.

In propeller pitch changing mechanisms, considerable power is required to overcome the centrifugal blade twisting moments, when changes in pitch are being effected. Also, to hold any particular pitch, the mechanism must be capable of resisting such twisting moments. Motors carried by the propeller hub have been, of necessity, relatively small and therefore limited in their capacity to rapidly change pitch due to the extensive reduction gearing required. By providing an efficient mechanism deriving its pitch changing power from the propeller prime mover or other adequate stationary source of power, the rate of pitch change is limited only by the strength and rate of movement of the parts transmitting the pitch changing torque from the source of power to the swivelled blades.

It is, accordingly, an object of the present invention to provide a compact means for transferring directly from a relatively stationary control gear to propeller hub carried gearing, motion capable of efficiently effecting pitch changes.

A further object of the invention is to provide a hub carried differential planetary gearing for effecting such changes adapted to be controlled by planetary gear trains whose sun or central gears are coaxial with the hub.

A still further object of the invention is to provide a compact hub carried differential planetary gearing, the differential planet gears of which are adapted to be shifted to effect pitch changes, by relative rotation of the sun and ring gears effected through planet gears reacting upon normally stationary planetary sun gears.

Yet another object of the invention is to provide a compact hub carried differential planetary gearing, an element of which is drivably connected to effect pitch changes, and the other elements of which are differentially driven through planetary gears having sun gears coaxial with the hub.

A further object is to provide a system of this description comprising two gears, which when held stationary prevent any change of pitch, and which are so interconnected that rotation of either of them alone or both of them relatively to each other will effect a change of pitch in one direction or the other, depending upon the direction of rotation of said gear or gears.

A further object is to provide a system of the above description comprising two gears, which when rotated at the same speed and in the same direction prevent any change of pitch, and which are so interconnected that when rotated relatively to one another, a change of pitch is occasioned in one direction or the other, depending upon the direction of relative rotation of said gears.

A further object is to provide a system of the above description comprising two gears, which when rotated in the same direction at different speeds bearing a constant ratio to one another prevent any change of pitch, and which are so interconnected that, when rotated at speeds not bearing said constant ratio to one another, a change of pitch is occasioned in one direction or the other, depending upon whether the ratio of the last mentioned speeds is greater or less than said constant ratio.

A further object is to provide means comprising a planetary driven differential planetary gear system for transmitting pitch changing motion between relatively rotating structures, irrespective of whether said structures rotate in the same or opposite directions, or whether one of the structures is stationary.

A further object is to provide planetary pitch changing mechanism which is an effective speed reducer and force multiplier, adapted to be driven at high speed and to substantially increase the driving force transmitted thereto from the source of power and thereby effect rapid changes in pitch.

A further object is to provide a pitch changing mechanism of the above description which is readily adapted to be driven by the engine or engine driven propeller shaft, or by any other source of power, such as a stationarily supported electric motor.

A further object is to provide a pitch changing mechanism which is high speed in operation, simple in construction, light in weight and compact, but powerful and rugged, and, therefore, particularly adapted for use on airplanes.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views.

Figure 1:
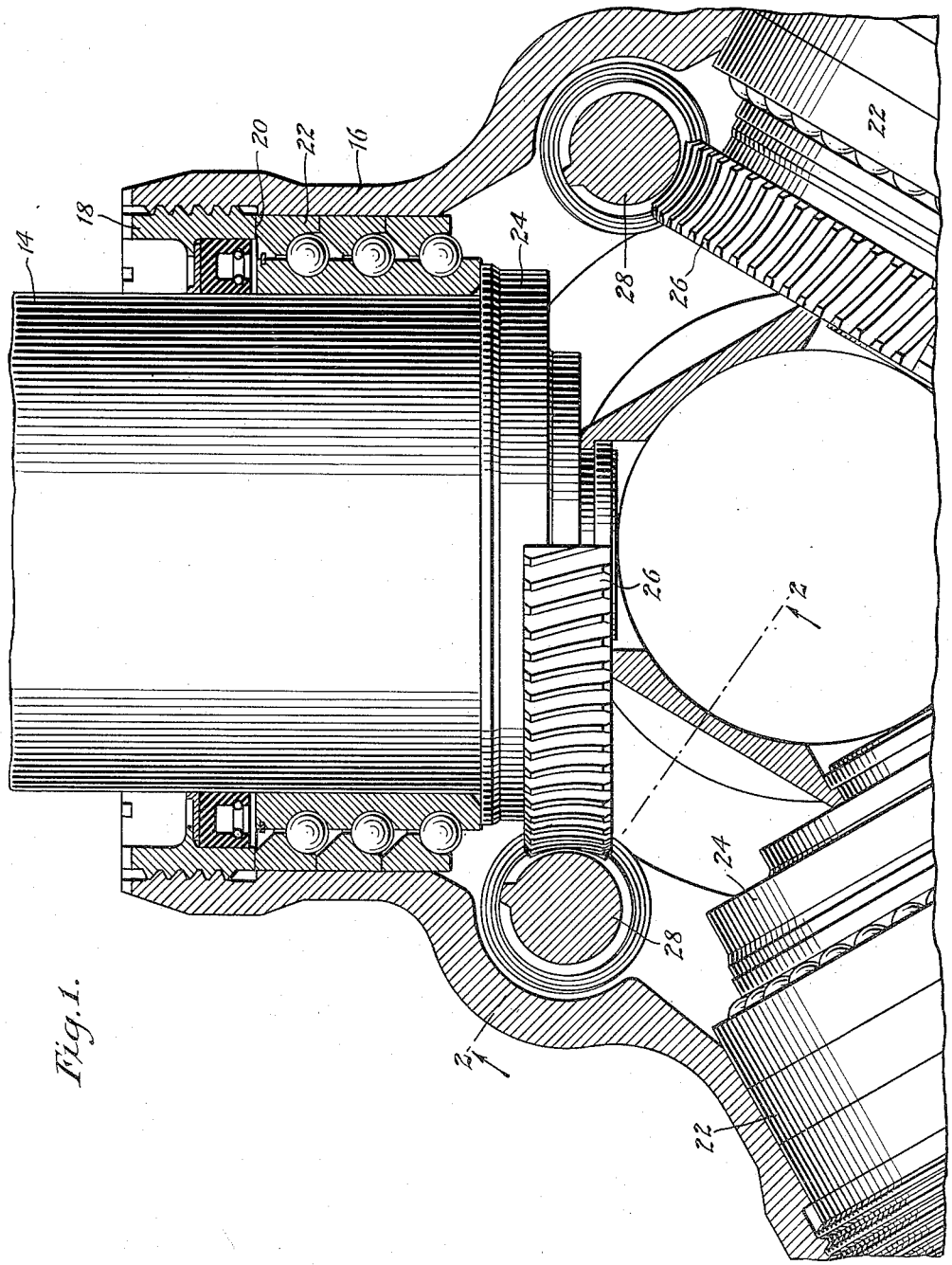
Fig. 1 is a fragmentary view of a propeller hub and blades shown partly in transverse section.
Figure 2:
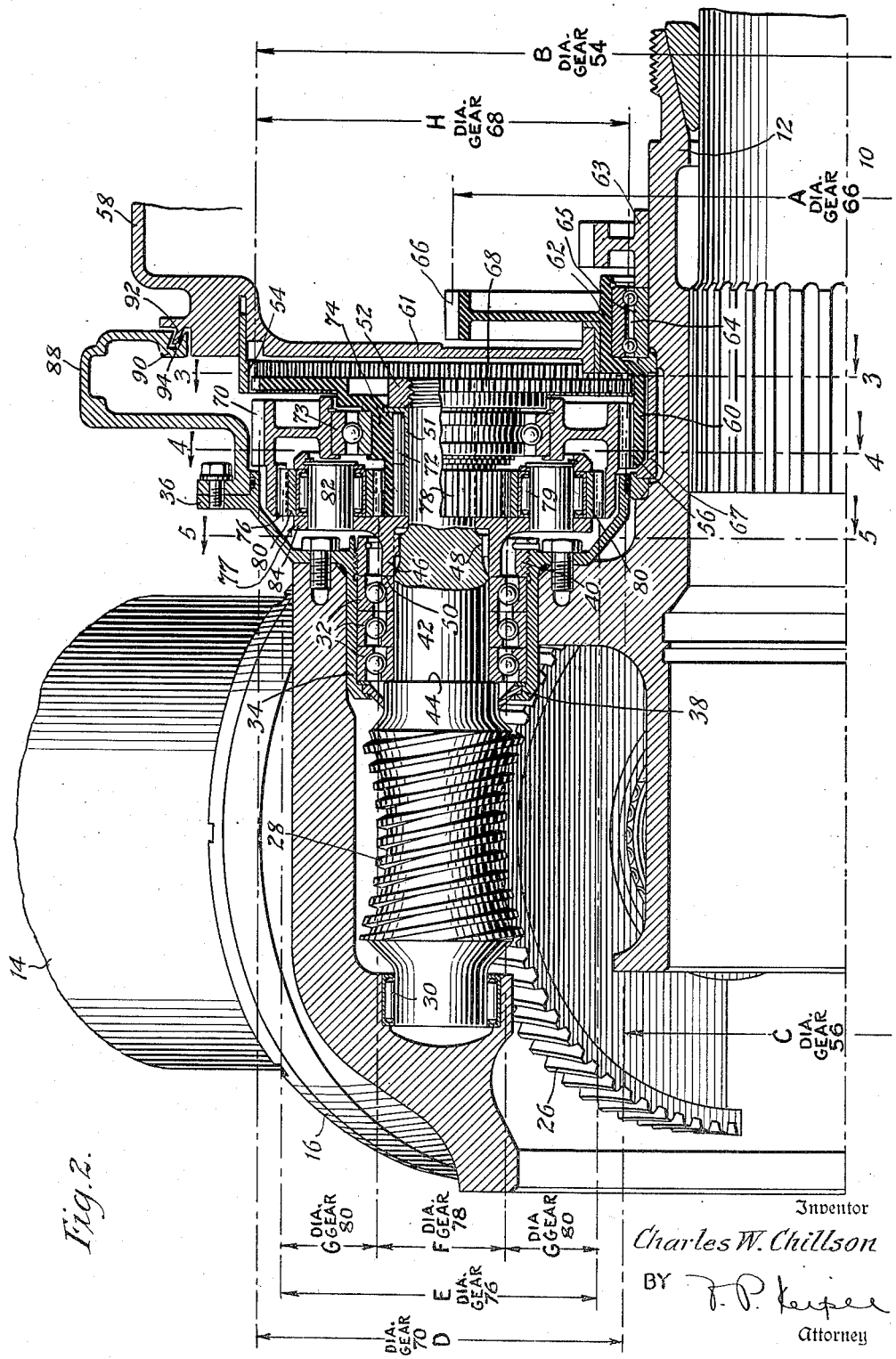
Fig. 2 is an axial section taken substantially on the line 2—2 of Fig. 1, the plane passing through the worm axis.
Figure 3:
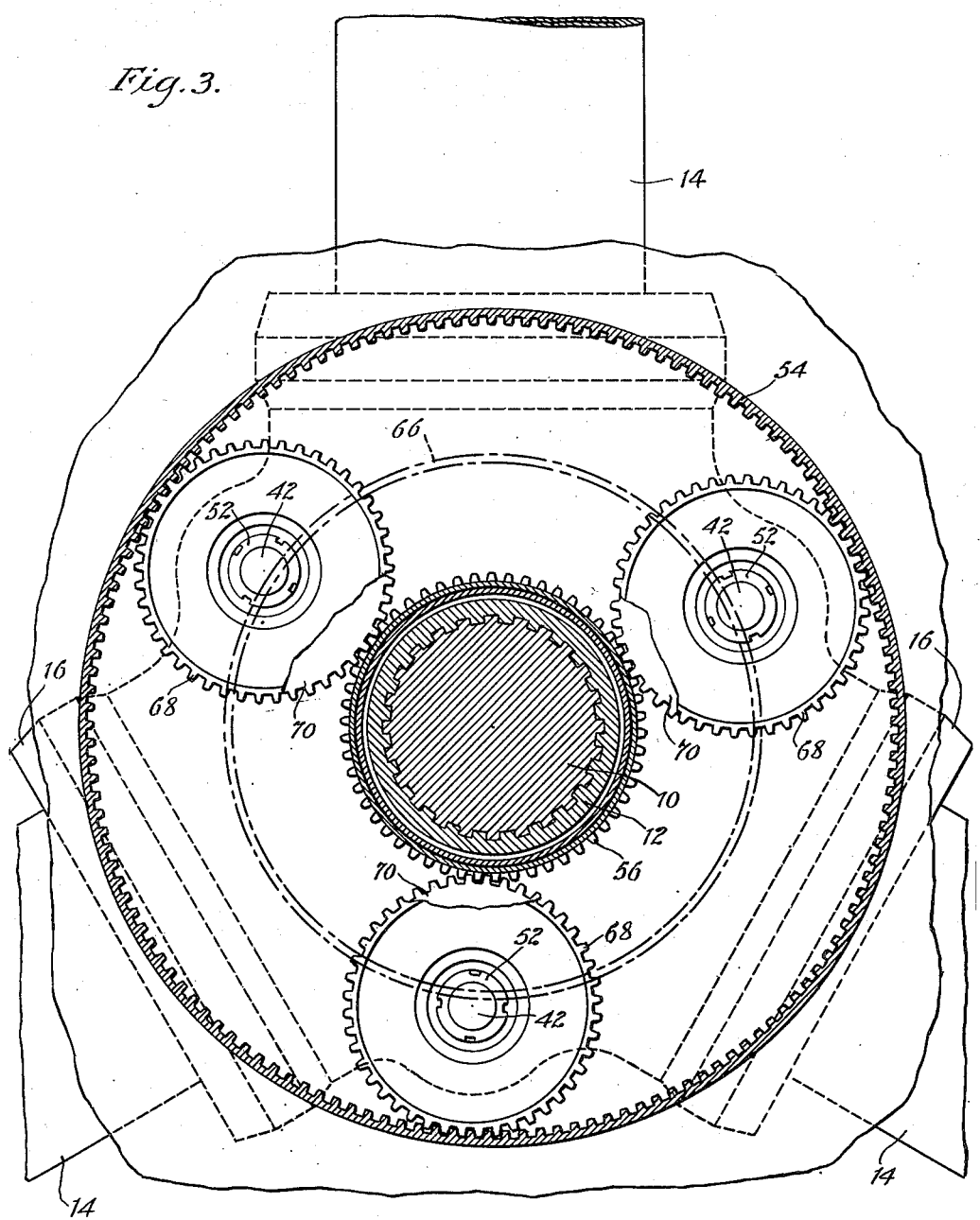
Fig. 3 is a transverse section taken substantially on the line 3—3 of Fig. 2.
Figure 4:
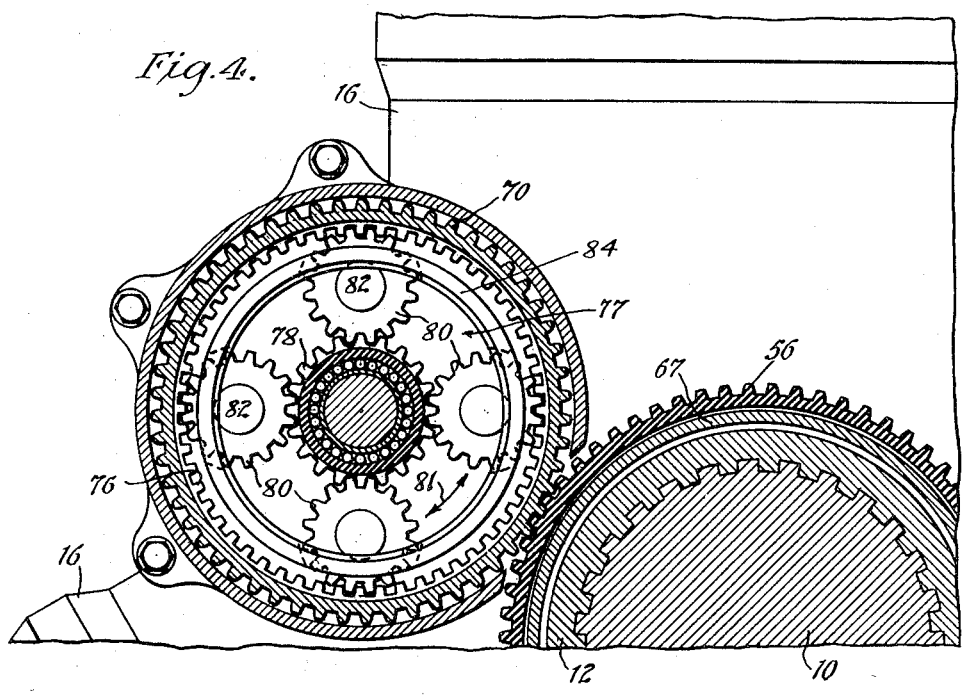
Fig. 4 is a transverse section taken substantially on the line 4—4 of Fig. 2.
Figure 5:
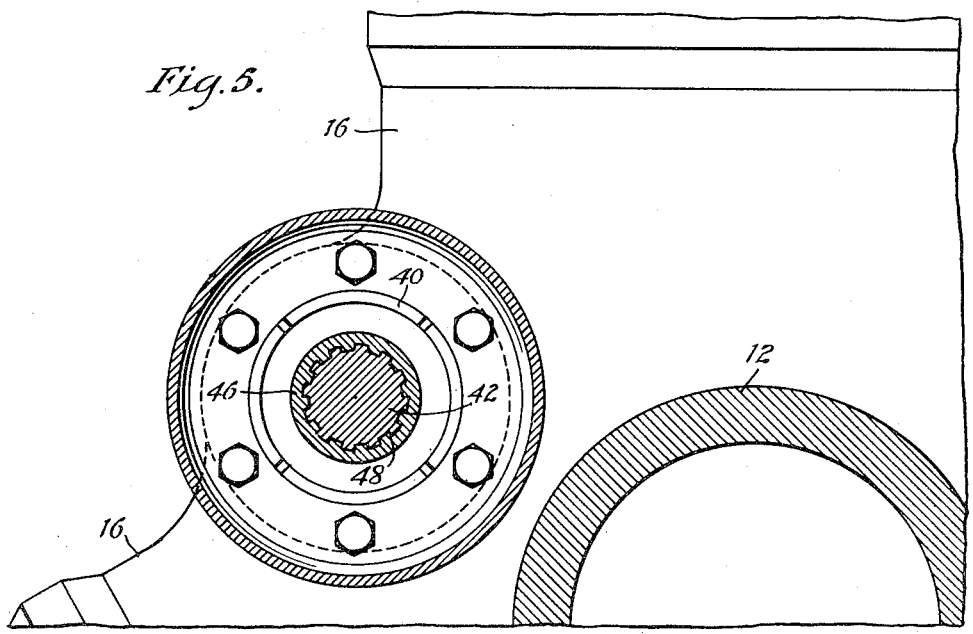
Fig. 5 is a transverse section taken substantially on the line 5—5 of Fig. 2.

Referring to the drawings and more particularly to Figs. 1 and 2, there will appear a propeller drive shaft 10 having splined thereon a propeller hub 12 provided with angularly adjustable propeller blades 14 held in blade retaining sockets 16 formed as a part of the hub. Each of the sockets is provided with a threaded internal retaining ring 18 forming a shoulder 20 against which blade retaining anti-friction thrust bearings 22 bear, the propeller blade shank being provided at its root end with a shoulder 24 adapted to engage the thrust bearings 22. The root end of each of the blades is also provided with a sector worm wheel 26 adapted to mesh with an hourglass worm 28 rotatable about an axis displaced from the hub axis but generally parallel therewith. Rotation of each of the worms in either direction is adapted to accordingly vary the pitch of the respective blades 14.

Referring to Fig. 2, it will appear that each of the worms is journalled in the hub by means of a plane roller bearing 30 at one end and a series of three thrust bearings 32 at the other end, two of which are adapted to absorb thrust in one direction and oppose the blade centrifugal twisting moment and the other of which absorbs the opposite thrust. The thrust bearings are carried within the sleeve portion of a flanged sleeve 34 and are locked in position within the sleeve between an internal shoulder 38 at one end and an internal annular nut 40 threaded on the inside wall of the sleeve 34. The flange 36 of the sleeve 34 is secured to an annular face on the hub member coaxial with the worm axis. The shank 42 of each of the worms is provided with a shoulder 44 abutting the thrust bearings 32, and extends through and beyond the thrust bearings to provide a bearing support for differential planetary gear mechanisms hereinafter to be more particularly described. To form an opposite shoulder for the thrust bearings 32 on the worm shank and to provide means for driving worm 28, there is arranged upon the shank 42 a spider or flanged sleeve member 46 splined upon the shank as at 48 and forming an annular abutment 50 bearing against the thrust bearings 32. The spider sleeve member is maintained in place upon the shank 42 through the end compression of a bearing sleeve 51 secured in place upon the shank by the end nut 52.

Rotation of each of the worms 28 to effect a change in blade angle is accomplished by a differential planetary 77 mounted coaxially with each worm. Each differential planetary comprises three relatively rotatable members, the rotation of any one member being dependent upon the relative rotations of the other two. One of the members is coupled to the worm. The other members are driven by planet gears of a pair of planetary trains, epicyclic and hypocyclic in character, the sun or central gears of which are coaxial with the hub axis.

In the form shown, like differential planetaries are provided for each blade, and pairs of planetary trains for driving the differential planetaries employing in common the sun gears previously set forth are provided. The sun gears thereby react in common upon all of the differential planetaries and may serve as master or control gears. As shown, the internal sun or central gear 54 is secured to a stationary housing 58 and is fixed against rotation relative thereto. The external sun or central gear 56 is integral with a sleeve 60 having an offset transverse section as at 62 to permit its mounting upon an anti-friction bearing 64 positioned on a cylindrical portion of the hub 12 adjacent the wall 61 of the stationary housing 58. The inner member 65 of the bearing 64 is positioned between a split thrust sleeve 67 and the collar forming gear 63 non-rotatably secured to the hub 12. The sleeve 60 carrying the sun gear 56 is adapted to be rotated in one direction or another to increase or decrease pitch and to be maintained non-rotatable to fix the pitch. Any suitable means may be employed for imparting motion to the sleeve 60, as a system of gearing and clutches deriving power from the shaft 10 and gear 63, or an electric or hydraulic motor, the sleeve 60 being shown with an integral gear 66 adapted to be driven or braked by such means as may be selected.

Rotatably carried upon the shank 42 of the worm and eccentric of the hub axis are planet gears 68 and 70, the former meshing with the stationary internal ring gear 54 and the latter meshing with the normally fixed sun gear 56. The planet gear 68 is freely journalled on anti-friction rollers 72 arranged about the bearing sleeve 51. The planet gear 68 is provided with an annular shoulder or ledge 74 for receiving an anti-friction bearing 73 for rotatably carrying the planet gear 70. It will appear that planet gears 68 and 70, in being carried around the hub axis, upon rotation of the hub, will be caused to rotate in reverse directions with respect to one another at speeds dependent upon the chosen diameters of the internal and external sun or central gears 54 and 56 and the planet gears 68 and 70. The reverse rotation of the planet gears 68 and 70 is transmitted to the inner and outer gears respectively of the differential planetary gearing composed of an outer internal gear 76 formed as an extension of the rim of gear 70, an inner external or sun gear 78 formed on a sleeve-like extension of the hub of gear 68. The reverse rotation of gears 76 and 78, rotates planet pinions 80, displacing such pinions when the pitch circle velocities of gears 76 and 78 are unequal. The planet pinions are rotatably mounted upon bearing rollers 79 arranged around pins 82 carried by the flanged portion 84 of the spider sleeve 46 so that displacement of the pinions effects rotation of the sleeve 46 and worm 28.

By choosing the proper diameters of the pitch circles of the various planetary gears, the opposed rotation of the internal gear and sun gear 76 and 78 may be such that the worms 28 are held from rotation. In the form shown wherein the pitch circles of the planets 68 and 70 are equal in diameter, if the ratio of the pitch circle diameters of the internal gear 76 to the sun 78 be the same as the ratio of the internal gear 54 to the sun gear 56, the worms will be prevented from rotation, so long as the gears 54 and 56 are held stationary or fixed against relative rotation. Since the gears 54 and 56 operate upon identical gearing associated with each of the blades and the pitch changing worms, the pitch of the blades may be thus maintained fixed. By rotation of one of the gears such as 56, in one direction or the other, relative to the other gear 54 or while the other gear 54 remains fixed, motion is transmitted to the differential planetary gearing such as to force rotation of the worm 28.

The flange 36 of the flanged sleeve 34 is extended and offset to provide a partial housing for the planetary gearing and is adapted to carry a second housing member 88 having an annular portion 90 concentric with the axis of the shaft 10. A circular rib 92 upon the stationary housing 58 cooperates with a circular groove 94 in the member 90 to provide in effect a rotary seal.

The operation of the invention in its various aspects can best be understood by assuming that the propeller is held stationary while the housing 58 is rotated in a direction opposite to the normal direction of propeller rotation. The relative motion between the propeller and housing will then be the same as in actual operation.

Let it now be assumed that the housing 58 is thus rotated in a counterclockwise direction, when viewed from the right of Fig. 2, through one complete revolution, and that the gears 54 and 56, which are normally stationary with respect to the housing, rotate with it an equal number of degrees for example, one revolution counterclockwise. If the pitch diameters of the various gears of the system be represented by the letters A to H inclusive as indicated in Fig. 2, gear 70 is rotated by gear 56 in a counterclockwise direction about shaft 42 through $$\frac{C}{D}$$

revolutions, and gear 76, which is integral with gear 70, is also rotated through $$\frac{C}{D}$$

revolutions in a clockwise direction.

If at this time the propeller pitch is held fixed, shaft 42 and spindles 82 are stationary and, therefore, clockwise rotation of gear 76 through $$\frac{C}{D}$$

revolutions will cause each of the planets 80 to rotate in a clockwise direction about its own spindle through $$\frac{E}{G} \times \frac{C}{D}$$

revolutions. Continuing, this rotation of the planets 80 causes gear 78 to rotate in a counterclockwise direction about shaft 42 through $$\frac{G}{F} \times \frac{E}{G} \times \frac{C}{D}$$

or $$\frac{E}{F} \times \frac{C}{D}$$

revolutions. Simultaneously with the rotational movements just described, the one counterclockwise revolution of the gear 54, which is made under the above hypothesis, causes a gear 68 to rotate in a counterclockwise direction about shaft 42 through $$\frac{B}{H}$$

revolutions, and as the gear 68 is integral with the gear 78, the latter is also rotated equally and in the same direction.

Now, if the worm shaft 42 is not to rotate about its own axis, thus retaining the blade pitch fixed, it is requisite that the speed of the gear 78 as occasioned by the gear train 54, 68 (B, H) be equal to and in the same direction as the speed of the same gear (78) as occasioned by the gear train 56, 70, 76, 80 (C, D, E and G), or, in other words, it is necessary that $$\frac{B}{H} = \frac{E}{F} \times \frac{C}{D}$$

or, by transposing, that $$\frac{E}{F} = \frac{D}{C} \times \frac{B}{H} = \frac{D}{C} \times \frac{C+D+H}{H}$$

Fig. 2 showing that $$B = C + \frac{D}{2} + \frac{H}{2} + \frac{D}{2} + \frac{H}{2} = (C+D+H)$$

As a concrete example, if $C=4.5$, $D=2.25$ and $H=2$, the ratio of E to F is 35:16, the value of B is 8.75 and the ratio of B to C is 35:18. As another example, if $C=4.5$ and if $D=H=2.25$, the ratio of E to F is the same as the ratio of B to C, both being equal to 2:1.

In the light of the preceding analysis, it is apparent that the present invention is not limited to any specific gear sizes or ratios, and that the dimensions of the gears may be chosen to suit power and space requirements, providing only that the last equation above given be satisfied. Under this condition it will appear that, whether the propeller be running or stopped, worm shaft 42 cannot rotate about its own axis as long as gears 54 and 56 are held stationary with respect to housing 58, and, therefore, no change in pitch can then occur.

It will also appear that pitch may be altered at any time, whether the propeller is running or not, by rotating the gear 56 relatively to housing 58. For example, assuming that gear 54 is as shown, fixed to housing 58, which is a preferred arrangement, and that gear 56 is rotatably mounted as previously described, and also assuming that the propeller is at rest, counterclockwise rotation of gear 56 will cause clockwise rotation of gears 70 and 76. Then, because gear 78 is held stationary through the medium of gears 54 and 68, planets 80 will be rotated and displaced bodily in a clockwise direction about the axis of shaft 42, thus rotating the latter and worm 28 in the same direction, through the agency of spindles 82 and the flange 84 of sleeve member 46. Rotation of worm 28 causes rotation of worm wheel 26, thus rotating the attached blade 14 about its longitudinal axis and so altering its pitch in one direction. To alter the blade pitch in the opposite direction, it is obviously merely necessary to reverse the rotation of gear 56 from a counterclockwise to a clockwise direction.

Furthermore, it will be apparent that the same results may be obtained by various modifications of the illustrated form of the invention. Thus, the gear 54, instead of being fixed to the housing 58, may be rotatably mounted and means may be provided for driving it, similar to the means provided for driving gear 56. If at the same time gear 56 is fixed with respect to housing 58, it is evident that pitch may be altered by rotation of gear 54 in the same manner as when gear 56 was rotated, as above described.

It is also evident that the same results are attained if both of the gears 54 and 56 are rotatably mounted. Under this condition, when both gears are held stationary or are rotated at the same speed in the same direction, no pitch change can occur, but when rotated relatively to one another a change of pitch is occasioned in one direction or the other, depending upon the direction of relative rotation of said gears. Further, under the above assumption that both of the gears 54 and 56 are rotatably mounted, it is clear that the blade pitch may also be held fixed if these gears are rotated in the same direction at different speeds, providing that the ratio R of the speed of one gear to the speed of the other is constant, and also providing that the following relationship exists between the diameters of the gears 76, 78, 70, 56 and 68, and the constant ratio R:

$$R \times \frac{E}{F} = \frac{D}{C} \times \frac{C+D+H}{H}$$

Under these conditions, if the gears 54 and 56 are rotated at speeds not bearing the constant ratio to one another, a change of pitch is occasioned in one direction or the other, depending upon whether the ratio of the speeds is greater or less than the constant ratio.

Since the invention is not limited to the transmission of pitch changing motion from a stationary structure to a single rotating propeller, it may be used for transmitting such motion between two coaxial relatively rotating propellers, for example, dual rotation propellers, or other structures.

In view of the foregoing, it is apparent that the action of the pitch changing mechanism of the present invention may be controlled in a plurality of different ways through the medium of gears 54 and 56 which perform the functions of control or master gears.

In addition to serving as a pitch changing mechanism, the planetary system of the present invention in the form illustrated also acts as an efficient force multiplying device, as may readily be seen by an inspection of Fig. 2. With, for example, the relative dimensions there indicated, a tangential force acting on the teeth of the gear 66 develops a force approximately four times as great on the spindle 82 of the planet 80 for rotating the worm shaft 42, or a plurality of such shafts.

Though a single embodiment of the invention has been illustrated and described with variations thereof, it is to be understood that the invention is not to be limited thereby, but may be embodied in various equivalent arrangements. For example, the differential planetary may have any one of its elements drivably connected to the worm and the other elements driven by epicyclic planetaries, or hypocyclic planetaries, instead of a combination thereof as illustrated. Further, while the mechanism is admirably suited to variable pitch propellers, the mechanism may be employed in other relationships where the transmission requirements between relatively rotatable members of a similar nature are required. As many changes in construction, arrangement and adaptation may be made without departing from the spirit of the invention, as will be apparent to those skilled in the art, reference will be had to the appended claims for a definition of the limits of the invention.

What is claimed is:

1. In a variable pitch propeller having a rotatable shaft, a hub drivably connected with said shaft, a plurality of propeller blades rotatably mounted in said hub, differential planetary gearing eccentrically arranged with respect to said shaft, having three elements relatively movable with respect to each other, means including stationary elements for driving two of said differential elements at different angular velocities oppositely to prevent rotation of said third element relative to the hub, means for moving one of said stationary elements relative to the other to effect rotation of said third element relative to the hub, and means for varying the pitch of a propeller blade in response to the rotation of said third element relative to the hub.

2. In a variable pitch propeller, a propeller blade carrying hub, differential planetary gearing carried by said hub and arranged around an axis eccentric to the axis of said hub, said gearing having three elements relatively movable with respect to each other, blade pitch changing mechanism drivably connected to one element of said gearing, means including normally stationary gears concentric with said shaft axis for relatively rotating both the other differential elements of said gearing in opposite directions relative to the hub to prevent movement of said drivably connected element relative to the hub, and means for rotating one of said stationary gears relative to the other to effect rotation of said drivably connected element relative to the hub to increase or decrease the pitch of said propeller blades.

3. A variable pitch propeller comprising a rotatable hub, blades swivelly mounted therein, and mechanism for changing the pitch of said blades, planetary differential gearing carried by said hub comprising a ring gear, planet gears and a sun gear, a rotatable spider for said planet gears operably connected to said pitch changing mechanism to effect changes of pitch upon rotation of said spider, and means including members for driving said sun gear and ring gear in opposite directions relative to said hub upon rotation of said hub to preclude rotation of said spider relative to said hub, to maintain the pitch of said blades fixed, and means for rotating one of said members relative to the other to vary the relative angular velocities of said sun and ring gears to effect rotation of said spider relative to said hub.

4. A variable pitch propeller comprising a rotatable hub, a blade swivelly mounted in said hub, a worm wheel carried on the root end of said blade, a worm meshing with said wheel arranged on an axis eccentric to said hub axis, a planet gear, a planet gear carrying spider keyed for rotation with said worm, sun and internal gears meshing with said planet gear, coaxial independent gears keyed for rotation with each of said sun gear and ring gear, and normally stationary internal and external gears meshed with said last named gears, the ratio of diameters of said last named gears being the same as the product of the ratio of diameters of said ring and sun gears and the ratio of the diameters of its respective coaxial independent gears.

5. A variable pitch propeller comprising a hub, a blade rotatable with respect to said hub, and means for effecting changes in pitch of said blade comprising differential planetary gearing having three coaxial elements relatively movable with respect to each other carried on said hub, one of said elements being drivably connected to said blade, two independent planetary gear trains each having a gear coaxial with said hub and having planet gears eccentric with respect to said hub axis and respectively drivably connected to two elements of said differential planetary gearing, and means for controlling the relative rotation of said independent planetary gear trains to effect changes in or hold the pitch of said blade.

6. In a propeller hub, blades swivelly mounted thereon, a shaft mounted on the hub for rotation with respect to the hub for varying the blade angle of the blades carried by the hub, differential planetary gearing comprising three elements relatively movable with respect to each other, one of which is drivably connected with said shaft, and two independent planetary gear trains each having their sun gears concentric with the hub axis, and their planet gears independently drivably connected to the remaining elements of said differential gearing.

7. In a propeller, a hub, blades swivelled thereon, means including a shaft, rotatable with respect to said hub and carried thereby for effecting rotation of at least one of said blades about the blade axis, differential gearing carried by said hub having three elements relatively rotatable with respect to each other and coaxial with said shaft, one of said elements being fixed to said shaft, and two sets of planetary gearing drivably connected with said other elements for causing the said other elements of said differential gearing to rotate relative to each other in response to hub rotation, at speeds adapted to fix the shaft element from rotation relative to the hub.

8. In a propeller, a hub, blades swivelled thereon, means including a shaft, rotatable with respect to said hub and carried thereby for effecting rotation of one of said blades about the blade axes, differential gearing carried by said hub having three elements relatively rotatable with respect to each other and coaxial with said shaft, one of said elements being fixed to said shaft, and two sets of planetary gearing drivably connected to said differential gearing for causing said other elements to rotate relative to each other and relative to said hub in response to hub rotation, at speeds adapted to fix the shaft element from rotation relative to the hub, and means for imparting movement to one of said sets of planetary gearing to force rotation of said shaft element relative to said hub in either direction.

9. In combination, a propeller comprising a hub, blades swivelly mounted therein for changing pitch, pitch change gearing including a driving shaft connected with each of said blades, a sun gear and an internal ring gear coaxial with each of said shafts and rotatable relatively thereto, a set of planet gears meshing with each of said sun and ring gears, spindles for said planet gears drivably connected with each of said shafts, means comprising two single planetary gear systems concentric with the axis of propeller rotation for driving said sun and ring gears to rotate said shafts and to prevent rotation thereof, a stationary control gear connected with one of said planetary systems, a rotatable control gear connected with the other of said systems, and means for alternatively holding said last mentioned gear stationary and for rotating it respectively to cause said planetary systems to hold said shafts in fixed position and to rotate them to actuate said pitch change gearing to alter the blade pitch.

10. In a variable pitch propeller comprising a hub having a blade journalled therein for pitch change, a three-element planetary gear eccentric to the hub axis having one element drivably connected to said blade for pitch change thereof, a gear connected to each of said other elements and concentric therewith, normally stationary propeller concentric reaction gears each engaged by one of said first gears, said first gears rotating in opposite directions relative to said hub as said hub rotates by the engagement of said first gears with said reaction gears whereby said blade-connected element is non-rotatable relative to the hub as said hub rotates and when said reaction gears are stationary, and means to rotate at least one of said reaction gears.

11. In a variable pitch propeller comprising a hub having a blade journalled therein for pitch change, a hub-borne shaft spaced from and parallel to the hub axis and drivably engaging the blade for pitch change, a spider on said shaft having pinions journalled thereon, a sun and a ring gear engaged with said pinions and journalled on the hub, each having a coaxial driving gear, an internal gear coaxial with the hub engaging one of said driving gears, a spur gear coaxial with the hub engaging the other of said driving gears, one of said hub-coaxial gears being secured against rotation, and means to hold and to rotate the other hub-coaxial gear in either direction.

CHARLES W. CHILLSON.

REFERENCES CITED

The following references are of record in the file of this patent:

UNITED STATES PATENTS

| Number | Name | Date |
| --- | --- | --- |
| 2,007,417 | Aivaz | July 9, 1935 |
| 2,127,463 | Chilton | Aug. 16, 1938 |
| 2,127,687 | Heath | Aug. 23, 1938 |
| 2,362,914 | McLeod | Nov. 14, 1944 |